United States Patent [19]
Auxier et al.

[11] Patent Number: 5,486,093
[45] Date of Patent: Jan. 23, 1996

[54] LEADING EDGE COOLING OF TURBINE AIRFOILS

[75] Inventors: Thomas A. Auxier, Palm Beach Gardens; Kenneth B. Hall, Jupiter, both of Fla.

[73] Assignee: United Technologies Corportion, Hartford, Conn.

[21] Appl. No.: 118,158

[22] Filed: Sep. 8, 1993

[51] Int. Cl.⁶ .................................................. B63H 1/14
[52] U.S. Cl. ................................................... 416/97 R
[58] Field of Search ........................................ 416/97 R

[56] References Cited

U.S. PATENT DOCUMENTS 4,384,823  5/1983  Graham et al. .................. 416/97 R

FOREIGN PATENT DOCUMENTS 26206   2/1982  Japan .................................. 416/97 R
51202   3/1983  Japan .................................. 416/97 R
200001  11/1984 Japan .................................. 416/97 R

*Primary Examiner*—John T. Kwon
*Attorney, Agent, or Firm*—Norman Friedland

[57] ABSTRACT

The leading edge of the turbine airfoil of a turbine blade for a gas turbine engine is cooled by utilizing helix shaped holes that are rectangular in cross-section and curved to produce film holes egressing at low angles adjacent the outer surface of the leading edge. The helix holes extend from the root to the tip of the blade and are parallelly and longitudinally spaced.

4 Claims, 5 Drawing Sheets

5,486,093

LEADING EDGE COOLING OF TURBINE AIRFOILS

TECHNICAL FIELD

This invention relates to internal cooling of airfoils of blades and vanes for gas turbine engines and particularly to means for cooling the leading edge of the airfoils.

BACKGROUND ART

As is well known in gas turbine engine technology, the leading edge of the airfoils of turbine blades are cooled through a combination of film cooling and coolant-side heat transfer augmentation. As one skilled in this art will appreciate, airfoil cooling technology that has evolved over the years during the course of the development of the gas turbine engine, is such that each portion of the airfoil has given rise to its own particular requirements which have manifested different and unique techniques to attain maximum cooling. For example, the leading edge, trailing edge, tip section, the mid-section require different techniques to attain maximum cooling effectiveness. The reason that the cooling aspect of the turbine is so abundantly important and has required the demanding attention of the engine designer and particularly giving each portion of the airfoil individualized attention is because the efficiency of the gas turbine engine is greatly enhanced by increasing turbine temperatures. However, the limiting factor of this temperature resides in the tolerance to heat that the particular materials used for these components exhibit. The material of the components subjected to the engine's hot gasses must retain their physical strength and as is well known the strength rapidly decreases at elevated temperatures.

Also well known in this technology is that the limiting life of the airfoil has been the shortcomings in the cooling effectiveness of the leading edge. Heretofore, the cooling techniques encompassed in the leading edge are in the coolant-side heat transfer augmentations which include impingement and radial flow with trip strips and film cooling. Film cooling is accomplished by machining a large number of tightly-packed cooling holes into the leading edge area.

While there have been dramatic improvements in the average cooling effectiveness of the airfoil, the leading edge remains the life limiting location. This is understandable because the external area of the leading edge that is exposed to hot gasses is greater than the internal area of the leading edge that is exposed to coolant. This imbalance at the leading edge is far greater than what is evidenced in other portions of the airfoil. In addition, heat load per unit area is highest at the leading edge where heat transfer coefficients peak. The small internal radius of the leading edge limits the number of holes which can be installed without intersecting each other and as a consequence, the relatively large external radius of the leading edge is sparsely populated with cooling holes.

Actual tests results have shown that heat transfer in the leading edge is greatly augmented at the entrance of these cooling holes, but the conduction length to the inner side of the leading edge, where cooling hole concentration and heat transfer augmentation is greatest, is large. Consequently, cooling effectiveness which can be attained through current well known methods of leading edge cooling is limited.

We have found that we can enhance leading edge cooling effectiveness by judiciously installing helical holes in a discrete manner in the leading edge. By proper orientation of the helical holes, cooling effectiveness can be enhanced in the following ways:

1) cooling hole surface area is moved closer to the outer surface of the leading edge. This reduction in average conduction length improves convective efficiency, and 2) higher heat-transfer coefficients are produced on the outer diameter of the helix, improving the capacity of the heat sink.

Additionally, we have found that by forming the cross section of the helix passages rectangularly, film coverage is maximized and by taking advantage of injecting the coolant at low angles film coverage is enhanced and hence, the overall film cooling effectiveness is improved.

The helical concept disclosed in this patent application is distinguishable over the types of helical passages disclosed in U.S. Pat. Nos. 4,684,322 granted to Clifford et al on Aug. 4, 1987 entitled "Cooled Turbine Blade" and 4,080,095 granted to Stahl on Mar. 21, 1978 entitled "Cooled Turbine Vane". These patents exemplify passages that are elongated and are twisted into a helix to define an helical passageway that extends radially or transversely to enhance heat transfer for transfer the heat from the heat source to an heat sink. In comparison, the present invention includes a plurality of passages that are densely packed into the leading edge and oriented where the discharge port flows the coolant in a film at a low angle to flow over the curved surface of the leading edge.

SUMMARY OF THE INVENTION

An object of this invention is to provide improved cooling of the leading edge of a turbine blade for a gas turbine engine.

A feature of this invention is to densely pack a plurality of parallelly and longitudinally spaced helical passages transversely extending along the leading edge of the turbine blade and oriented to lay a film of coolant adjacent the outer surface of the leading edge.

A still further feature is to provide for turbine blades helical passages in the leading edge whose shape in cross section is either square or rectangular.

A still further feature is to provide a helical shaped passage cooling system for the leading edge of the turbine blades of a gas turbine engine that includes an inlet for each of the helical passages that communicate with the coolant in a longitudinal passage in the leading edge that extends from the root to the tip of the blade.

The foregoing and other features of the present invention will become more apparent from the following description and accompanying drawings.

BEST MODE FOR CARRYING OUT THE INVENTION

While this invention is particularly efficacious when employed in airfoils for turbine blades used in gas turbine engines for powering aircraft, as one skilled in this art will appreciate this invention has application for blades that require cooling whether it be for turbine blades or other blades or vanes as for example, compressor blades, stator vanes and the like and whether it is used for turbine engines powering aircraft or utilized in turbine engines used in marine or industrial applications. Suffice it to say that this invention is particularly applicable in application where it is desirable to optimize cooling the leading edge of the airfoil of the blade of a rotor or the vane of a stator.

Figure 1:
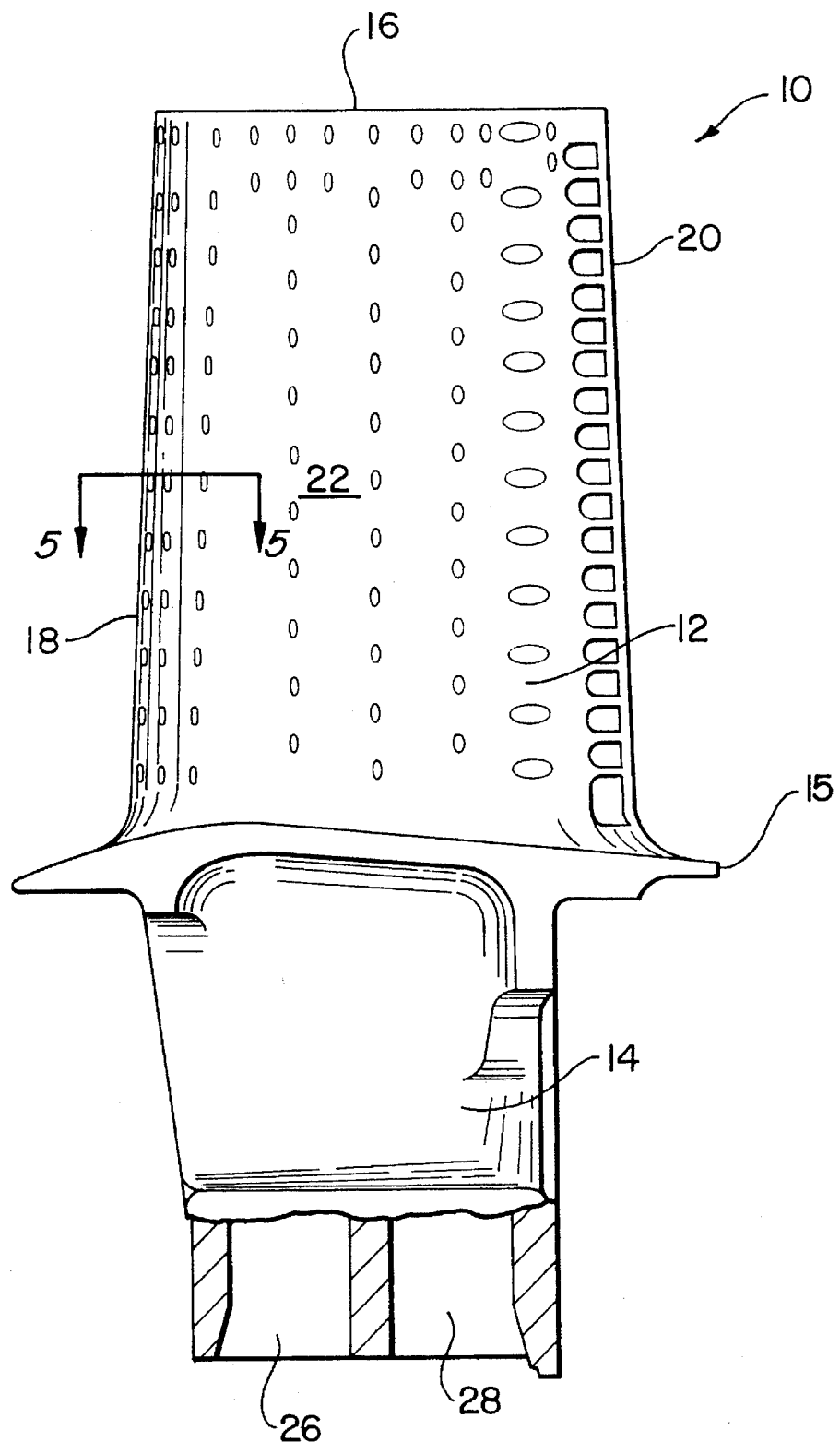
FIG. 1 is a view in elevation of a turbine blade for a gas turbine engine utilizing the present invention.

FIG. 1 which is a view in elevation of a typical axial flow turbine blade generally indicated by reference numeral 10 of a gas turbine engine for powering aircraft comprising an airfoil 12, a root section 14, a platform 15, a tip section 16, a leading edge 18, and a trailing edge 20. In this FIG. 1 the pressure side 22 is in view and the suction side is diametrically opposed on the back face of the pressure side 22. Coolant, which is typically bled from a compression stage of the compressor section (not shown) of the gas turbine engine is fed internally into the internal passages of the airfoil through the inlet passageways 26 and 28 located at the root 14 of the blade. As one skilled in the art will appreciate the turbine rotor comprises a plurality of circumferentially spaced blades 12 supported in a suitable disk is a well known manner that is secured to the engine shaft. The airfoil serves to extract energy from the engine's working medium for powering the turbine rotor which in turn drives the compressor. Excess energy in the gas path is utilized to generate thrust in a well known manner. As the operation of the gas turbine engine is not germane to this invention the remaining portion of this description will be devoted to the cooling aspects of this invention.

Figure 2:
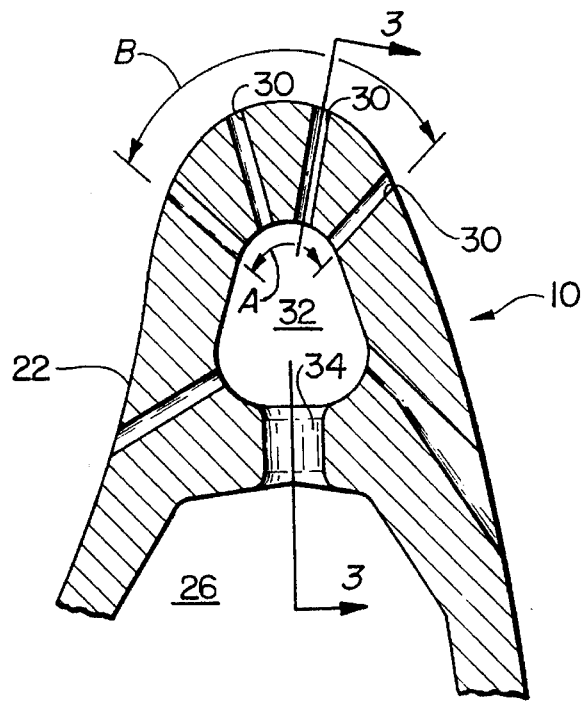
FIG. 2 is a prior art showing of a partial sectional view of the leading edge of a turbine blade illustrating the typical cooling.
Figure 3:
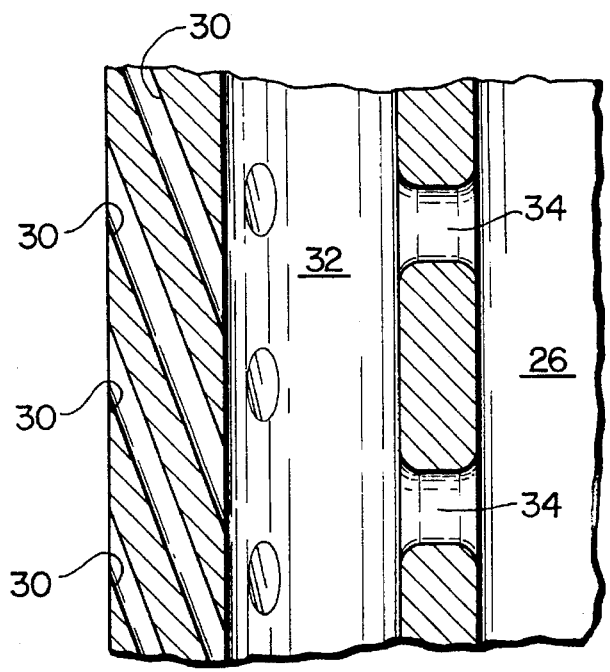
FIG. 3 is a partial view in section taken through lines 3—3 of FIG. 2.
Figure 4:
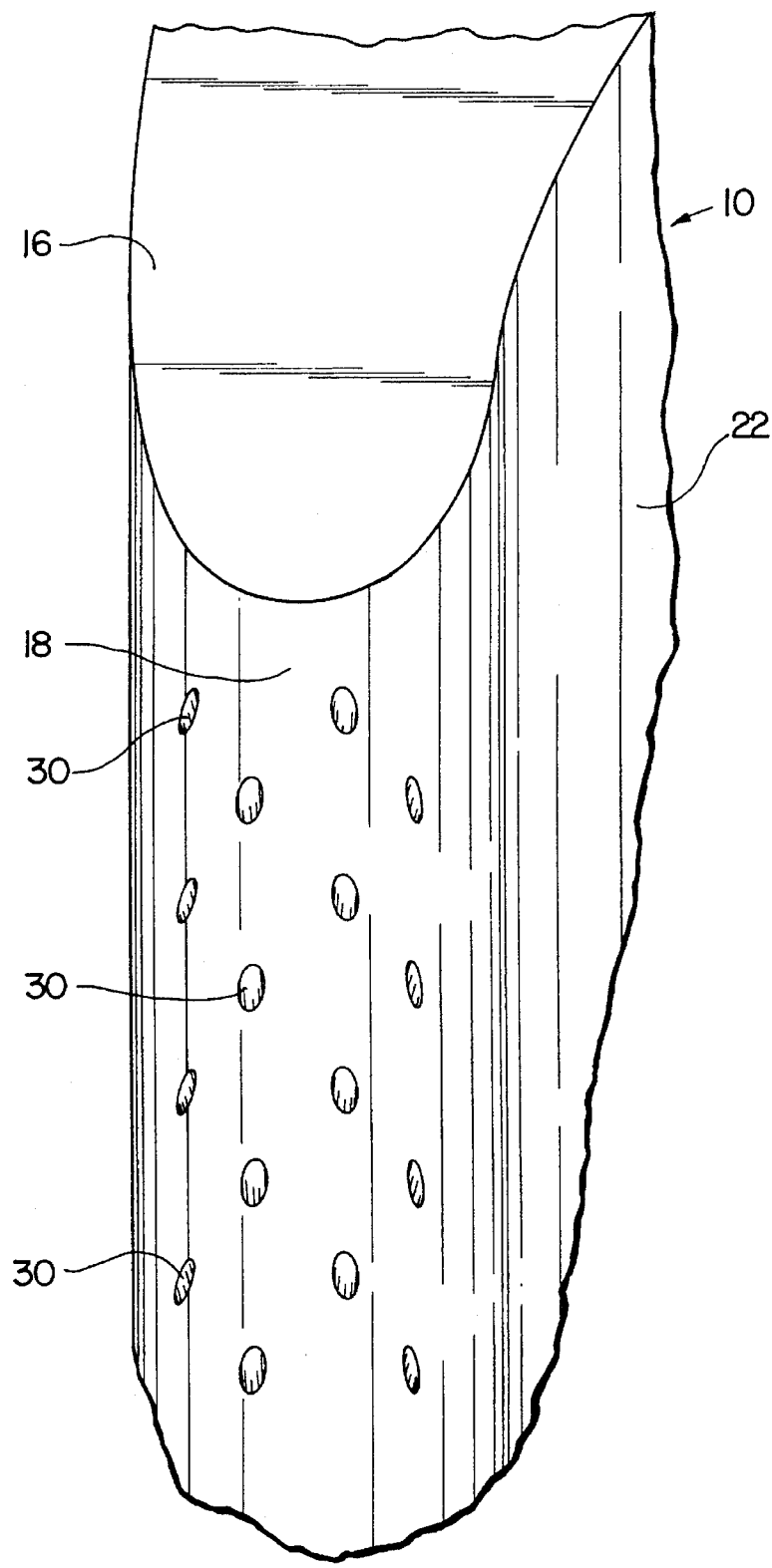
FIG. 4 is a front plan view of the prior art leading edge of the blade depicted in FIG. 2.

Perhaps the best way to understand this invention is to consider the cooling aspects of the leading edge that have been utilized heretofore. This is best seen by referring to FIGS. 2–4. FIG. 2 which is a sectional view of the leading edge 18 taken through a plane transverse to the longitudinal axis of the blade shows the film cooling holes 30 communicating with the longitudinal passageway 32 that is in communication with the passage 26 at the root of the blade via the impingement holes 34.

As will be appreciated the small radius extending over the curvature identified by reference letter A limits the number of holes which can be installed without intersecting adjacent holes. This obviously leaves a relatively large radius at the outer curvature of the leading edge identified by reference numeral B. Hence, it is obvious that the external area which is exposed to the hot gas path is larger than the internal area that is exposed to the coolant, resulting in a relatively ineffective cooling effectiveness. Testing has shown that the heat transfer is greatly augmented at the entrance of cooling holes where cooling hole concentration and heat transfer augmentation is greatest. However, the conduction length of holes 30 from the entrance to the inner edge 36 of the leading edge is relatively large. Consequently, cooling effectiveness which can be attained through current state-of-the-art cooling techniques for leading edge cooling is limited.

Figure 5:
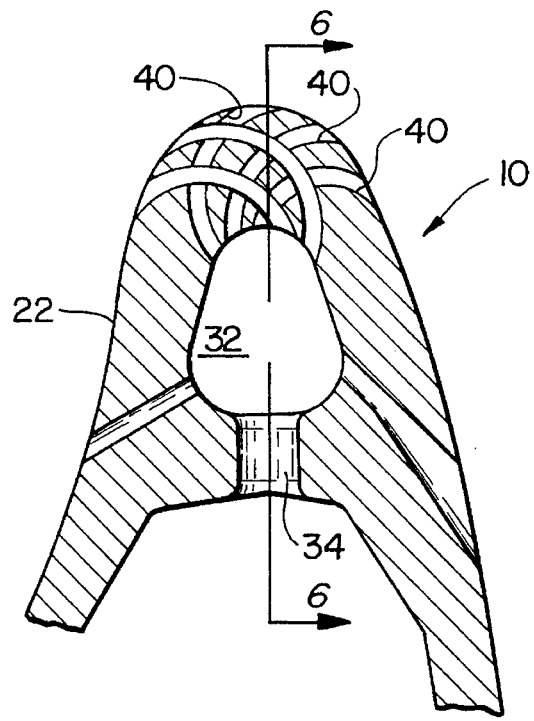
FIG. 5 is a partial view in section taken along lines 5—5 of FIG. 1 and shows a compressed view of the helical passages.
Figure 6:
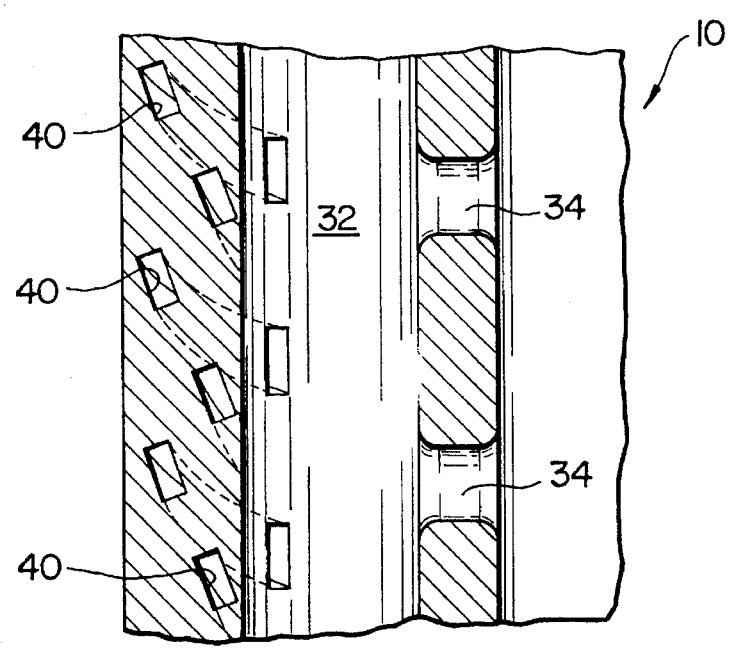
FIG. 6 is a partial view in section taken along lines 6—6 of FIG. 5.
Figure 7:
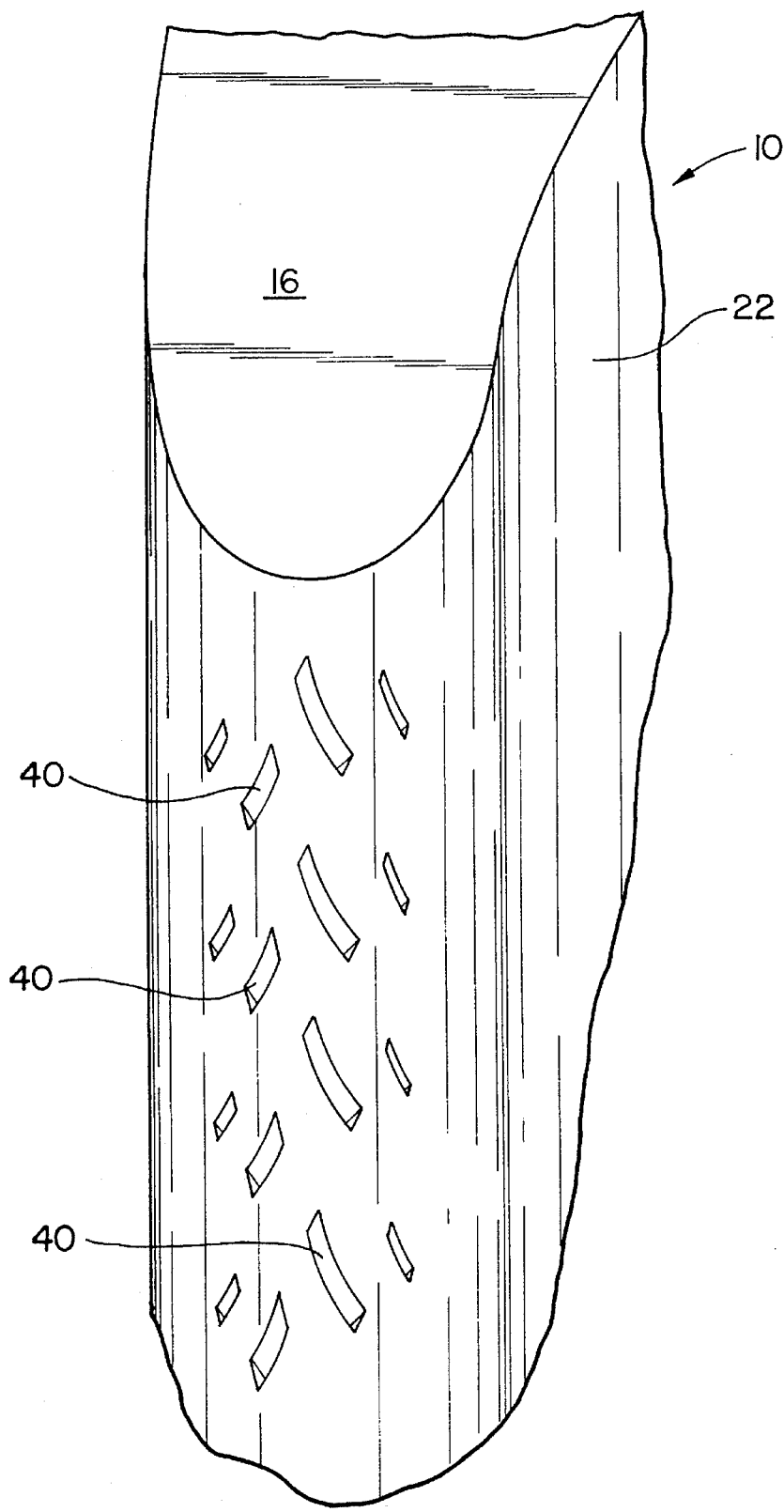
FIG. 7 is a partial plan view of the leading edge of the blade depicted in FIG. 5.

According to this invention, helical cooling holes 40 as depicted in FIGS. 5–7 replace the straight through holes 30 to attain a more effective cooling without the cost of additional coolant. (In the description like reference numerals depict identical parts in all the Figs.). The prior art blade is modified in this description to describe the present invention.

As noted in FIG. 5 the holes 40 which may be cast or drilled in any well known manner, say by electrochemical milling, laser drilling, and the like, are curved in a helical form that extends from the wall of passage 32 to the exterior of the leading edge and the curvature is in a direction that imparts a flow to the coolant so that upon discharging the coolant will conform to the curvature of the outer surface of the leading edge 16. Additionally, as best seen in FIGS. 6 and 7, the holes are shaped in cross section into rectangles or squares. This serves to maximize film coverage of the outer surface of the leading edge and the low angle of coolant ejection improves film effectiveness by improving film coverage. As is apparent from the foregoing the helix holes 40 are spaced parallelly and longitudinally extending from the root to the tip along the leading edge.

By virtue of this invention the cooing effectiveness is improved because the cooling hole surface area is moved closer to the outer surface of the leading edge with a consequential reduction in average conduction length so as to improve convective efficiency. Additionally, higher heat-transfer coefficients are produced on the outer diameter of the helix hole 40, improving the capacity of the heat sink. And in addition, the rectangular cross-section of holes 40 and the low angle of coolant injection by the proper orientation of the helix holes 40 maximizes film coverage over the leading edge exterior surface and enhances cooling effectiveness.

Although this invention has been shown and described with respect to detailed embodiments thereof, it will be appreciated and understood by those skilled in the art that various changes in form and detail thereof may be made without departing from the spirit and scope of the claimed invention.

We claim:

1. An air cooled airfoil for a turbine blade of a gas turbine engine, said airfoil having a root section, a tip section, a leading edge, a pressure side, a suction side and a trailing edge, a longitudinal passageway extending from said root section to said tip section for leading cooling air internally of said airfoil, said longitudinal passageway being disposed between said suction side and said pressure side, another longitudinal passage extending adjacent said leading edge and including longitudinally spaced holes interconnection said longitudinal passageway and said another longitudinal passageway, and means for supplying air to be admitted into said root section, the improvement comprising a plurality of helical shaped holes extending from said another longitudinal passageway to the exterior of said airfoil adjacent to said leading edge for discharging cooling air from said airfoil and each helical shaped holes being curved toward said leading edge, whereby heat transfer by convection in the leading edge is enhanced.

2. An air cooled airfoil as claimed in claim 1 wherein the cross section of said helical shaped holes are rectangularly shaped.

3. An air cooled airfoil as claimed in claim 2 wherein a portion of said helical shaped holes are disposed in a lateral plane in said airfoil and additional portion of said helical shaped holes are spaced longitudinally relative to each other.

4. An air cooled airfoil as claimed in claim 3 wherein each of said helical shaped holes includes a discharge orifice, said discharge orifice being oriented with respect to the surface of said leading edge to discharge said cooling air in a film extending over a portion of said surface.

* * * * *